(12) United States Patent  
Bourcier et al.

(10) Patent No.: US 9,114,595 B2  
(45) Date of Patent: *Aug. 25, 2015

(54) MULTIPLE LAYER POLYMER INTERLAYERS HAVING A MELT FRACTURED SURFACE

(71) Applicant: Solutia Inc., St. Louis, MO (US)

(72) Inventors: David Paul Bourcier, Ludlow, MA (US); John Joseph D'Errico, Glastonbury, CT (US); Jean-Pierre Etienne, Rhode St. Genese (BE); Gary Matis, Wilbraham, MA (US); Jun Lu, East Longmeadow, MA (US)

(73) Assignee: SOLUTIA INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,271

(22) Filed: Jul. 30, 2013

(65) Prior Publication Data

US 2013/0312898 A1 Nov. 28, 2013

Related U.S. Application Data

(60) Continuation of application No. 12/980,073, filed on Dec. 28, 2010, now Pat. No. 8,529,813, which is a division of application No. 11/734,797, filed on Apr. 13, 2007, now abandoned.

(51) Int. Cl.
*B29C 47/06* (2006.01)
*B32B 17/10* (2006.01)
(Continued)

(52) U.S. Cl.
CPC ......... *B32B 17/1055* (2013.01); *B29C 47/0021* (2013.01); *B29C 47/065* (2013.01);
(Continued)

(58) Field of Classification Search
USPC ........... 264/173.12, 173.14; 156/99, 100, 106
See application file for complete search history.

(56) References Cited

U.S. PATENT DOCUMENTS 3,377,848 A   4/1968   Marvin
3,998,792 A   12/1976  Hermann et al.
(Continued)

FOREIGN PATENT DOCUMENTS

EP   0 710 545 A1   5/1996
JP   08-143346      6/1996
(Continued)

OTHER PUBLICATIONS

"Measuring Machine of Surface Roughness Shape SURFCOM series Description on Parameters," Tokyo Seimitsu Co., Ltd. 1999, 8 pages.

(Continued)

*Primary Examiner* — Jeffrey Wollschlager
(74) *Attorney, Agent, or Firm* — Michelle Bugbee

(57) ABSTRACT

The present invention provides multiple layer interlayers having a soft inner polymer layer and relatively stiff outer layers that can be laminated without unacceptable optical distortion and used in various multiple layer glass panel type applications. Multiple layer interlayers of the present invention have surface topography that is formed by controlling the melt fracture that occurs at the exposed surface of the interlayer, or individual layers of the multiple layer interlayer, during formation of the interlayer. By precisely controlling the surface topography of the interlayer, lamination of the interlayer with a rigid substrate does not lead to unacceptable optical distortion caused by the transfer of the surface topography through outer, stiffer layers into softer, internal layers of the interlayer.

27 Claims, 1 Drawing Sheet

(51) Int. Cl.
  *B29C 47/00* (2006.01)
  *B32B 7/12* (2006.01)
  *B29C 47/04* (2006.01)
  *B29K 23/00* (2006.01)
  *B29K 27/06* (2006.01)
  *B29K 29/00* (2006.01)
  *B29K 67/00* (2006.01)
  *B29K 69/00* (2006.01)
  *B29K 75/00* (2006.01)
  *B29K 77/00* (2006.01)
  *B29K 105/00* (2006.01)
  *B29L 9/00* (2006.01)

(52) U.S. Cl.
  CPC ............ *B32B 7/12* (2013.01); *B32B 17/10577* (2013.01); *B32B 17/10761* (2013.01); *B32B 17/10935* (2013.01); *B29C 47/0057* (2013.01); *B29C 47/043* (2013.01); *B29K 2023/12* (2013.01); *B29K 2027/06* (2013.01); *B29K 2029/04* (2013.01); *B29K 2067/00* (2013.01); *B29K 2069/00* (2013.01); *B29K 2075/00* (2013.01); *B29K 2077/00* (2013.01); *B29K 2105/0026* (2013.01); *B29K 2105/0032* (2013.01); *B29K 2105/0038* (2013.01); *B29K 2105/0044* (2013.01); *B29L 2009/00* (2013.01)

(56) References Cited

U.S. PATENT DOCUMENTS

| | | |
|---|---|---|
| 4,812,267 A | 3/1989 | Hoffmann et al. |
| 5,190,826 A | 3/1993 | Asahina et al. |
| 5,340,654 A | 8/1994 | Ueda et al. |
| 5,425,977 A | 6/1995 | Hopfe |
| 5,455,103 A | 10/1995 | Hoagland et al. |
| 5,595,818 A * | 1/1997 | Hopfe et al. .............. 428/327 |
| 6,077,374 A * | 6/2000 | Hopfe ........................ 156/102 |
| 6,372,352 B1 | 4/2002 | Bletsos et al. |
| 6,451,435 B1 | 9/2002 | Klafka et al. |
| 6,521,347 B1 | 2/2003 | Anderson et al. |
| 6,599,630 B1 | 7/2003 | Fugiel et al. |
| 6,649,269 B1 | 11/2003 | Phillips et al. |
| 6,800,355 B2 | 10/2004 | Wong |
| 6,824,868 B2 | 11/2004 | Bell et al. |
| 6,863,956 B1 | 3/2005 | Nakajima et al. |
| 6,903,152 B2 | 6/2005 | Toyama et al. |
| 7,138,166 B2 | 11/2006 | Rinehart et al. |
| 7,150,905 B2 | 12/2006 | Nakajima et al. |
| 7,157,133 B2 | 1/2007 | Moran |
| 7,847,184 B2 | 12/2010 | Hayes et al. |
| 7,883,761 B2 | 2/2011 | Bourcier et al. |
| 8,168,885 B2 | 5/2012 | Hayes et al. |
| 2003/0012964 A1 | 1/2003 | Choi et al. |
| 2003/0022015 A1 | 1/2003 | Wong |
| 2003/0034119 A1 | 2/2003 | Molinari et al. |
| 2003/0124296 A1 | 7/2003 | Smith |
| 2003/0139520 A1 | 7/2003 | Toyama et al. |
| 2003/0148114 A1 | 8/2003 | Bourcier et al. |
| 2003/0161997 A1 | 8/2003 | Moran |
| 2003/0203167 A1 | 10/2003 | Bell et al. |
| 2003/0203214 A1 | 10/2003 | Bell et al. |
| 2004/0191482 A1 | 9/2004 | Nakajima et al. |
| 2004/0221526 A1 | 11/2004 | Rinehart et al. |
| 2004/0234730 A1 | 11/2004 | Rinehart et al. |
| 2004/0234731 A1 | 11/2004 | Rinehart et al. |
| 2005/0048229 A1 | 3/2005 | Elwakil et al. |
| 2005/0163976 A1 | 7/2005 | Travis |
| 2005/0192398 A1 | 9/2005 | Wong et al. |
| 2005/0202264 A1 | 9/2005 | Smith et al. |
| 2005/0271865 A1 | 12/2005 | Elwakil et al. |
| 2005/0287341 A1 | 12/2005 | Nakajima et al. |
| 2006/0141212 A1 | 6/2006 | Smith et al. |
| 2006/0159610 A1 | 7/2006 | Stenzel et al. |
| 2006/0182983 A1 | 8/2006 | Paul et al. |
| 2006/0183833 A1 | 8/2006 | Wong et al. |
| 2006/0188695 A1 | 8/2006 | Yacovone |
| 2006/0210782 A1 | 9/2006 | Lu |
| 2006/0263608 A1 | 11/2006 | Choi et al. |
| 2007/0000593 A1 | 1/2007 | Chen et al. |
| 2007/0003746 A1 | 1/2007 | Chen et al. |
| 2007/0009714 A1 | 1/2007 | Lee et al. |
| 2007/0042160 A1 | 2/2007 | Nakajima et al. |
| 2007/0048519 A1 | 3/2007 | Anderson et al. |
| 2007/0065629 A1 | 3/2007 | Rinehart et al. |
| 2007/0071955 A9 | 3/2007 | Elwakil et al. |
| 2007/0087137 A9 | 4/2007 | Elwakil et al. |
| 2007/0092706 A1 | 4/2007 | Pesek et al. |
| 2007/0116945 A1 | 5/2007 | Goldfinger et al. |
| 2007/0122633 A1 | 5/2007 | Pesek et al. |
| 2007/0125490 A1 | 6/2007 | Elwakil et al. |
| 2007/0154694 A1 | 7/2007 | Samuels et al. |
| 2007/0154718 A1 | 7/2007 | Silverman et al. |
| 2007/0172636 A1 | 7/2007 | Smith et al. |
| 2007/0172637 A1 | 7/2007 | Hayes et al. |
| 2007/0196629 A1 | 8/2007 | Smith et al. |
| 2007/0196630 A1 | 8/2007 | Hayes et al. |

FOREIGN PATENT DOCUMENTS

| | | |
|---|---|---|
| JP | H09501619 A | 2/1997 |
| JP | 2000 256043 | 9/2000 |
| JP | 2002 037648 | 2/2002 |
| JP | 2003 528749 A | 9/2003 |
| JP | 2004 099354 | 4/2004 |
| JP | 2004 143008 | 5/2004 |
| JP | 2005 289038 | 10/2005 |
| WO | WO 95/05283 | 2/1995 |
| WO | WO 95/19885 | 7/1995 |
| WO | WO 2004/018197 A1 | 3/2004 |
| WO | WO 2006/102049 A | 9/2006 |
| WO | WO 2008/128003 A1 | 10/2008 |

OTHER PUBLICATIONS

Notification of Transmittal of the International Search Report and the Written Opinion of the International Searching Authority, or the Declaration, dated Aug. 1, 2008 received in International Patent Application No. PCT/US2008/059961.

Notification Concerning Transmittal of International Preliminary Report on Patentability dated Oct. 13, 2009 received in International Patent Application No. PCT/US2008/059961.

European Office Action dated Feb. 22, 2010 received in European Patent Application No. 08 745 549.9.

\* cited by examiner

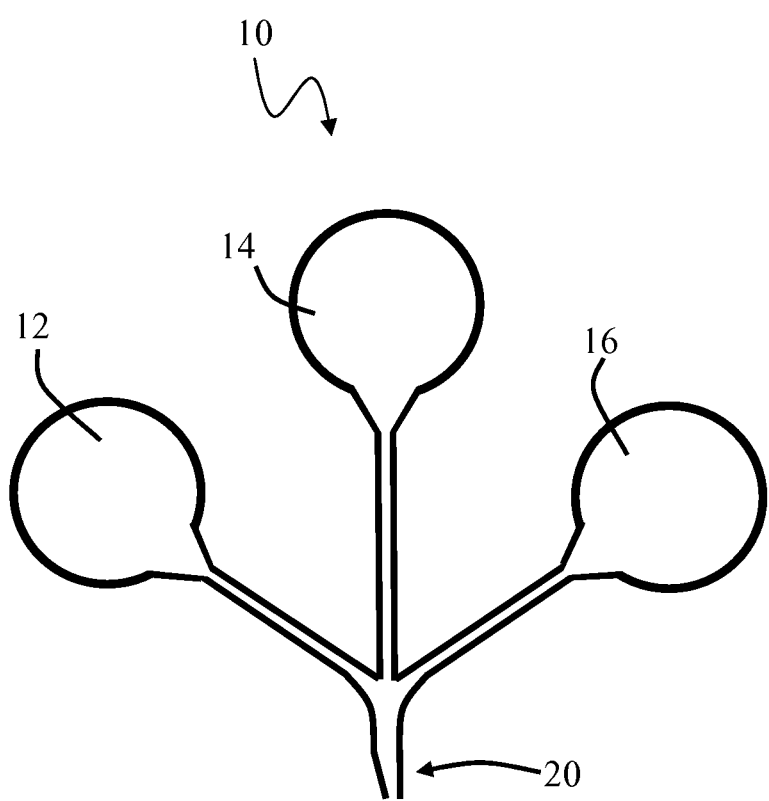

MULTIPLE LAYER POLYMER INTERLAYERS HAVING A MELT FRACTURED SURFACE

CROSS REFERENCE TO RELATED APPLICATIONS

This application is a Continuation of U.S. patent application Ser. No. 12/980,073 filed Dec. 28, 2010, now U.S. Pat. No. 8,529,813 B2, which is a Divisional of U.S. patent application Ser. No. 11/734,797 filed Apr. 13, 2007 now abandoned, the entire disclosures of which is are herein incorporated by reference.

BACKGROUND OF THE INVENTION

1. Field of the Invention

The present invention is in the field of polymer interlayers and multiple layer glass panels comprising polymer interlayers, and, more specifically, the present invention is in the field of polymer interlayers comprising multiple thermoplastic polymer layers.

2. Description of the Related Art

Poly(vinyl butyral) (PVB) is commonly used in the manufacture of polymer layers that can be used as interlayers in light-transmitting laminates such as safety glass or polymeric laminates. Safety glass often refers to a transparent laminate comprising a poly(vinyl butyral) layer disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

The thermoplastic polymer found in safety glass can consist of a single layer of a thermoplastic polymer, such as poly(vinyl butyral), that has had one or more physical characteristics modified in order to, for example, reduce the percentage transmission of sound through the glass. Conventional attempts at such acoustic dampening have included using thermoplastic polymers with low glass transition temperatures. Other attempts have included using two adjacent layers of thermoplastic polymer wherein the layers have dissimilar characteristics (see, for example U.S. Pat. Nos. 5,340,654 and 5,190,826, and U.S. Patent Application 2003/0139520 Al).

A particular problem encountered with multiple layer interlayers arises at the lamination stage of processing. While single layer interlayers have conventionally been embossed with rollers to impart a texture that facilitates deairing, three layer interlayers having a relatively soft inner layer between two relatively stiffer layers, such as is found in some acoustic interlayers, will develop optical distortion if embossing of the outer surfaces of the interlayer is transferred to the inner, softer layer. European application EP 0 710 545 Al details this problem, and cautions against embossing too deeply on the outer layers of a three layer interlayer.

Further compositions and methods are needed to improve multiple layer interlayers and the multiple layer glazing panels in which they are used, and, specifically, in multiple layer glass panels comprising poly(vinyl butyral) layers, without negatively impacting optical quality.

BRIEF SUMMARY OF THE INVENTION

The present invention provides multiple layer interlayers having a soft inner polymer layer and relatively stiff outer layers that can be laminated without unacceptable optical distortion and used in various multiple layer glass panel type applications.

Multiple layer interlayers of the present invention have surface topography that is formed by controlling the melt fracture that occurs at the exposed surface of the interlayer, or individual layers of the multiple layer interlayer, during formation of the interlayer. By precisely controlling the surface topography of the interlayer, lamination of the interlayer with a rigid substrate does not lead to unacceptable optical distortion caused by the transfer of the surface topography through outer, stiffer layers into softer, internal layers of the interlayer.

BRIEF DESCRIPTION OF THE FIGURES

FIG. 1 represents a schematic cross sectional view of a multiple manifold coextrusion device of the present invention.

DETAILED DESCRIPTION OF PREFERRED EMBODIMENT(S)

The present invention is directed to multiple layer interlayers that are useful in laminated glass applications in which the use of multiple layer interlayers having relatively stiff outer layers and a soft inner layer is desirable. One type of multiple layer interlayer that utilizes softer inner layers is the multiple layer acoustic type of interlayer. As disclosed herein, acoustic interlayers of the present invention comprise multiple layers, with a preferred embodiment having a relatively soft layer sandwiched between two relatively stiff layers. The resulting three layer interlayer can generally be used in lamination processes directly in place of conventional, single layer interlayers, with little or no modification to the lamination process.

While the invention will be described herein throughout as applicable to such acoustic interlayers, it will be understood by those of skill in the art that the invention includes multiple layer interlayers—for example three layer interlayers—having an inner polymer layer that is softer than the outer layers between which it is disposed, which includes non-acoustic multiple layer interlayers.

According to the present invention, it has now been surprisingly discovered that deairing of multiple layer interlayers can be facilitated without any embossing through the intentional introduction of melt fracture to the outer layers of the multiple layer interlayer. Melt fracture is typically controlled by forming the layer through a rectangular sheeting die opening formed by lands that are at a temperature less than that of the bulk of the extruding melt. This is achieved by moving conditioning fluid through channels just below the land surfaces. Melt fracture can further be controlled in one or both outer surfaces of the outer layers of the multiple layer interlayer by controlling other processing parameters of the extruded layer (see U.S. Pat. Nos. 5,455,103; 6,077,374; 5,425,977; 4,281,980; and 4,575,540, as well as Polymer Processing Instabilities: Control and Understanding, Edited by Savvas Hatzikirialcos and Kalman Migler, CRC Press 2004, /SBN 0824753860).

In various embodiments of the present invention, melt fracture can be induced in one side of a polymer layer, for example, by extruding a polymer onto a die roll, or on two sides of a polymer layer, for example, by extruding a polymer directly into the air and then into a cooling bath. One or both surfaces of the outer polymer layers are produced using this controlled melt fracture to produce a polymer layer having the desired "roughness", or "$R_z$", and $R_{sm}$. $R_z$ is a measure of the surface topography of a polymer layer and is an indication of divergence of the surface from a plane. $R_{sm}$ is a measure of the distance between peaks in the topography of the surface of a polymer layer. Both measurements will be described in detail, below.

In various embodiments of the present invention, a multiple layer interlayer is produced, having no embossing, in which the outer surfaces of the interlayer have an $R_z$ value of 20 to 60, or 25 to 50 that has been imparted through melt fracture. The two outer surfaces can have the same $R_z$ value or a different value. In other embodiments, only one of the two outer surfaces has the designated $R_z$ value. In yet other embodiments, either one or both of the outer layers of an interlayer have the designated $R_z$ value on the inner surface, which is disposed in contact with an inner, relatively soft layer.

In various embodiments of the present invention, the outer surfaces of an interlayer of the present invention have an $R_{sm}$ value of less than 800, 750, or 700. In further embodiments, only one outer surface has the designated $R_{sm}$ value. In yet other embodiments, one or both of the inner surfaces of the outer layers of an interlayer have the designated $R_{sm}$ value. The $R_{sm}$ values given can be combined with the $R_z$ values given in any suitable combination to produce the desired surface characteristics. That is, interlayers of the present invention can have an $R_z$ value of 20 to 60 and an $R_{sm}$ value of less than 800, less than 750, or less than 700, and can also have an $R_z$ value of 25 to 50 and an $R_{sm}$ value of less than 800, less than 750, or less than 700.

The resulting interlayer, with the specified $R_z$ and/or $R_{sm}$, can he readily laminated between two glazing layers such as glass. The $R_z$ and $R_{sm}$ values given above, which are created by melt fracture and which are present on at least one, and preferably both outer surfaces of the outer layers of a three layer interlayer, result in outer surfaces that can be readily deaired after they are placed in contact with glass layers and laminated, for example using a nip roll or vacuum ring deairing process.

As used herein, with regard to $R_z$ and $R_{sm}$, "imparted by melt fracture" means that surface texture measured by $R_z$ and $R_{sm}$ is produced through the melt fracture phenomenon at the time of extrusion.

Multiple layer interlayers of the present invention that function to reduce sound transmission through a glass panel include those known in the art, for example, and not limited to those disclosed in U.S. Pat. No. 5,190,826, which teaches the use of acetals of differing carbon length, Japanese Patent Application 3124441A and U.S. Patent Application 2003/0139520 Al, which teach the use of differing polymerization degree, and Japanese Patent 3,377,848 and U.S. Pat. No. 5,340,654, which teach the use of residual acetate levels of at least 5 mole % in one of two adjacent layers as a compositional difference. In a preferred embodiment, superior sound suppression characteristics can be imparted on multiple layer glass panels by incorporating a multiple layer interlayer into the panels, where the interlayer comprises two polymer layers having different plasticizer concentrations.

By formulating polymer layers as described above, sound transmission through multiple layer glass panels can be reduced by, for example, more than 2 decibels in the frequency or frequency region of interest. Further, because embodiments having three polymer layers can be formulated to be easily handled and used as a direct replacement for conventional interlayers in conventional processes, interlayers of the present invention will be usable in many applications without requiring any modification to the manufacturing method used in the applications. For example, automotive windshield applications can involve the use of a conventional polymeric interlayer that can be replaced with an interlayer of the present invention without altering the lamination process used to form the finished windshield.

As used herein, an "interlayer" is any thermoplastic construct that can be used in multiple layer glass applications to provide adequate penetration resistance and glass retention properties, such as is desired in safety glass in windshields and architectural windows, and a "multiple layer" interlayer is any interlayer that is formed by combining, usually through laminating processes or coextrusion, two or more individual layers into a single interlayer.

In various embodiments of the present invention, a multiple layer interlayer comprises at least two polymer layers disposed in contact with each other, wherein each polymer layer comprises a thermoplastic polymer, as detailed elsewhere herein. The thermoplastic polymer can be the same or different in each layer. In these embodiments, a sound dampening effect is imparted to the interlayer by fabricating each polymer layer with a different composition, and then laminating the two layers together to form a single, multiple layer interlayer that has the desired sound reducing benefit. In a preferred embodiment, as described below, a high plasticizer content polymer layer is sandwiched between two low plasticizer content layers to form a three layer interlayer. The composition of the polymer layers is such that net migration of plasticizer from one polymer layer to another is negligible or zero, thereby maintaining the plasticizer differential.

As used herein, "plasticizer content" can be measured as parts per hundred resin (phr) parts, on a weight per weight basis. For example, if 30 grams of plasticizer is added to 100 grams of polymer resin, then the plasticizer content of the resulting plasticized polymer would be 30 phr. As used herein throughout, when the plasticizer content of a polymer layer is given, the plasticizer content of that particular layer is determined with reference to the phr of the plasticizer in the melt that was used to produce that particular layer.

For layers of unknown plasticizer content, the plasticizer content can be determined via a wet chemical method in which an appropriate solvent, or a mixture of solvents, is used to extract the plasticizer out of the layer. By determining the weight of the sample layer and the weight of the extracted layer, the plasticizer content in phr can be calculated. In the case of a two polymer layer interlayer, one polymer layer can be physically separated from another before the plasticizer content in each of the polymer layers is measured.

In various embodiments of the present invention, the plasticizer content of the two polymer layers differ by at least 8 phr, 10 phr, 12 phr, 15 phr, 18 phr, 20 phr, or 25 phr. Each layer can have, for example 30 to 100 phr, 40 to 90 phr, or 50 to 80 phr.

In various embodiments of the present invention, the residual hydroxyl contents of the thermoplastic polymer components of the polymer layers are different, which allows for the fabrication of layers with stable plasticizer differences, As used herein, residual hydroxyl content (as vinyl hydroxyl content or poly(vinyl alcohol) (PVIDH) content) refers to the amount of hydroxyl groups remaining as side groups on the polymer chains after processing is complete.

For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments of the present invention, the residual hydroxyl content of the two adjacent polymer layers can differ by at least 1.8%, 2.0%, 2.2%, 2.5%, 3.0%, 4.0%, 5.0%, 7.5%, or by at least 10%. This difference is calculated by subtracting the residual hydroxyl content of the layer with the lower residual hydroxyl content from the residual hydroxyl content of the layer with the greater residual hydroxyl content. For example, if a first polymer layer has a residual hydroxyl content of 20 weight percent, and a second polymer layer has a residual hydroxyl content of 17 weight percent, then the residual hydroxyl content of the two layers differs by 3 weight percent.

For a given type of plasticizer, the compatibility of that plasticizer in poly(vinyl butyral) is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer and formulate each of the polymer layers to allow for the proper plasticizer loading and to stably maintain the difference in plasticizer content between the polymer layers.

As is known in the art, residual hydroxyl content can be controlled by controlling reaction times, reactant concentrations, and other variables in the manufacturing process. In various embodiments, the residual hydroxyl content of the two layers is as follows: first layer less than 25% and second layer less than 23%; first layer less than 23% and second layer less than 21%; first layer less than 21% and second layer less than 19%; first layer less than 20% and second layer less than 17%; first layer less than 18% and second layer less than 15%; first layer less than 15% and second layer less than 12%. In any of these embodiments, any of the values given in a previous paragraph for the difference in hydroxyl content between the two layers can be used, as appropriate.

As used herein, tensile break stress, or tensile strength, of a polymer layer is defined and measured according to the method described in JIS K6771, with a relatively "soft" polymer layer having a lower tensile break stress value than a relatively "stiff" polymer layer. In various embodiments of the present invention, the two polymer layers have a tensile break stress according to the following, wherein the first polymer layer in the following list is the polymer layer with the lower plasticizer content: first polymer layer greater than 135 kilograms per square centimeter and second polymer layer less than 120 kilograms per square centimeter; first polymer layer greater than 150 kilograms per square centimeter and second polymer layer less than 135 kilograms per square centimeter; first polymer layer greater than 165 kilograms per square centimeter and second polymer layer less than 150 kilograms per square centimeter; or first polymer layer greater than 180 kilograms per square centimeter and second polymer layer less than 165 kilograms per square centimeter. A third polymer layer, disposed in contact with the second polymer layer opposite the first polymer layer so as to sandwich the second polymer layer between the first and third polymer layers, can be added to any of the above embodiments, with the third layer having the same or different composition as the first polymer layer, and preferably having the same composition as the first polymer layer.

While the tensile break stress values provided in the preceding paragraph represent values that could be used for acoustic type multiple layer interlayers, those of skill in the art will recognize that the methods and interlayers of the present invention are useful for any multiple layer interlayer having a relatively soft inner layer and one or more relatively stiff outer layers. Accordingly, in various embodiments of the present invention, one or both outer layers have a tensile break stress that is an least 15 kilograms per square centimeter, 20 kilograms per square centimeter, or 25 kilograms per square centimeter greater than the tensile break stress of the inner layer.

As used herein, a conventional laminated glass is formed through laminating a conventional interlayer, which is typically used today for commercial laminated glass, wherein the conventional interlayer has a tensile break stress of 200 kilograms per square centimeter or higher. For the purpose of the present invention, conventional laminated glass is referred to as a "reference laminate panel" or "reference panel."

Improvement in acoustic insulation as used to characterize glass laminates consisting of the interlayers of the present invention is determined with reference to a reference laminate panel as described in the previous paragraph. In typical laminates with two outer layers of glass, the "combined glass thickness" is the sum of the thickness of the two layers of glass; in more complex laminates with three or more layers of glass, the combined glass thickness would be the sum of the three or more layers of glass.

For purposes of the present invention a "coincident frequency" means the frequency at which a panel exhibit a dip in sound transmission loss due to "coincident effect". The coincident frequency of the reference panel is typically in the range of 2,000 to 6,000 Hertz, and can be empirically determined from a monolithic sheet of glass having a thickness equal to the combined glass thickness of glass in the reference panel from the algorithm $$f_c = \frac{15,000}{d}$$

where "d" is the total glass thickness in millimeters and "$f_c$" is in Hertz.

For purposes of this invention, improvement in acoustic performance can be measured by an increase in sound transmission loss at the coincident frequency (reference frequency) of the reference panel.

"Sound transmission loss" is determined for a laminate of the present invention or conventional reference panel of fixed dimensions with ASTM E90 (95) at a fixed temperature of 20° C.

In various embodiments of the present invention, multiple layer interlayers of the present invention, when laminated between two panes of glass sheet, reduce the transmission of sound through the laminated glass panel by at least 2 decibels (dB) relative to a comparable reference panel having a single conventional interlayer with a comparable thickness of the multiple layer interlayer of the present invention.

In various embodiments of the present invention, interlayers of the present invention, when laminated between two sheets of glass, improve the sound transmission loss by at least 2 dB, more preferably 4 dB, and even more preferably 6 dB or higher, say 8 dB or higher at the reference frequency relative to a comparable reference panel.

Prior art attempts to produce interlayers comprising adjacent polymer layers that reduce sound transmission through a multiple layer glass panel have relied on various compositional permutations between those layers. Examples include U.S. Pat. No. 5,190,826, which teaches the use of acetals of differing carbon length, and Japanese Patent Application 3124441A and U.S. Patent Application 2003/0139520 Al, which teach the use of differing polymerization degree. Two other applications, Japanese Patent 3,377,848 and U.S. Pat. No. 5,340,654, teach the use of residual acetate levels of at least 5 mole % in one of two adjacent layers as a compositional difference.

In various embodiments of the present invention, and distinctly different from the approach used in those applications, two adjacent polymer layers of the present invention have the differing plasticizer content as described above, and each further has a residual acetate content of less than 5 mole %, less than 4 mole %, less than 3 mole %, less than 2 mole %, or less than 1 mole %. These residual acetate concentrations can be combined with the residual hydroxyl contents given above, in any combination, to form two polymer layers of the present invention having the described differences in plasticizer content and residual hydroxyl content while having little to no residual acetate content. Further embodiments of multiple layer interlayers of the present invention include interlayers having more than two polymer layers, wherein one or more of the additional polymer layers has a residual acetate content of less than 5 mole %, less than 4 mole %, 20 less than 3 mole %, less than 2 mole %, or less than 1 mole %.

Further embodiments of the present invention include any of the foregoing embodiments further comprising a third polymer layer that is disposed in contact with the polymer layer having the higher plasticizer content. Addition of this third polymer layer results in a three layer construct that has the following structure: First polymer layer with relatively low plasticizer content//Second polymer layer with relatively high plasticizer content//Third polymer layer. This third polymer layer can have the same composition as the first polymer layer, as it does in preferred embodiments, or it can be different.

In various embodiments, the third polymer layer has the same composition as the first polymer layer, which provides a three layer laminated interlayer that has a relatively difficult to handle polymer layer laminated between two relatively easy to handle layers, resulting in a multiple layer interlayer that is relatively easy to handle and which can be incorporated directly into existing processes that previously used a single polymer layer having the composition of the outer two polymer layers of the interlayer of the present invention, or a composition that results in similar processing characteristics (for example, blocking tendency), In other embodiments utilizing three polymer layers in a single interlayer, the third polymer layer has a different composition than the first polymer layer, and the differences in composition between the third polymer layer and the second polymer layer can be any of the differences given above for the differences between the first polymer layer and the second polymer layer. For example, one exemplary embodiment would be: first polymer layer with a residual hydroxyl content of 20%//second polymer layer with a residual hydroxyl content of 16%//third polymer layer with a residual hydroxyl content of 18%. It will be noted that, in this example, the third polymer layer differs from the second polymer layer at least in that it has a residual hydroxyl content that is 2% greater than the hydroxyl content of the second polymer layer. Of course, any of the other differences noted herein throughout can singly or in combination distinguish the third polymer layer from the second polymer layer.

In addition to the three layer embodiments described herein, further embodiments include interlayers having more than three layers in which further low residual hydroxyl layers can be used, for example, iterations of polymer layers having alternating plasticizer contents with alternating hydroxyl content and optionally low or negligible residual acetate content. Interlayers formed in such a manner can have, for example, 4, 5, 6, or up to 10 individual layers.

Other conventional layers, as are known in the art, can be incorporated into the interlayers of the present invention. For example, polymer films (described in detail elsewhere herein) such as polyesters like poly(ethylene terephthalate) having a metallized layer, an infrared reflecting stack, or Other performance layer deposited thereon, can be included between any two layers of polymer layers of the present invention. For example, in a two layer embodiment, an interlayer can be fabricated with the following layout: polymer layer with relatively high plasticizer content//polyester film having a performance layer//polymer layer with relatively low plasticizer content. In general, additional layers of thermoplastics, such as poly(vinyl butyral), polyester films, primer layers, and hardcoat layers can be added to the multiple layer interlayers of the present invention according to the desired result and the particular application.

Separate layers of a multiple layer interlayer of the present invention can also be produced in one step using a coextrusion process. For each of the multiple layer glass panels, methods of producing interlayers, and methods of producing multiple layer glass panels of the present invention in which separate polymer layers are laminated together to form a multiple layer interlayer, the multiple layer interlayer can be produced using a coextrusion method to achieve the same result, and, for the purposes of the present invention, coextrusion of multiple melts results in multiple polymer layers being formed together as one interlayer.

Multiple layer interlayers of the present invention are preferably coextruded using a multiple manifold coextrusion device such as the one shown in FIG. 1. As shown in schematic cross sectional view generally at 10, an extrusion device has a first die manifold 12, a second die manifold 14, and a third die manifold 16. The device shown in FIG. 1 operates by simultaneously extruding polymer melts from each manifold (12, 14, 16) toward the extrusion opening 20, where the multiple layer interlayer is extruded as a composite of three individual polymer layers. Layer thickness can be varied by adjusting the distance between the die lips at the extrusion opening 20, Melt fracture is controlled though control of the composition of the melts, the temperature of the die lips or lands at the extrusion opening 20, or through control of the rate and method of cooling of the extruded interlayer, which can be, for example, immersed in a cooling bath soon after extrusion.

As used herein, a "polymer layer" includes layers that are produced individually and then laminated together and layers that are coextruded. For example, an interlayer that is produced by coextruding three melts will have three individual "polymer layers" just as will an interlayer that is produced by laminating three individually produced polymer layers into a single interlayer. Melt fracture can be controlled on any surface that is exposed to the environment after extrusion. In the case of coextrusion of a three polymer layer interlayer, for example, the two outer surfaces can be controlled with melt fracture. In the case of three individual layers that are laminated together to form the interlayer, any of the surfaces of the three layers can be controlled through melt fracture prior to assembly of the layers. In various embodiments, the two surfaces of the individual polymer layers that will form the outer surfaces of the laminated multiple layer interlayer are controlled trough melt fracture.

In addition to the interlayers provided herein, the present invention also provides methods of reducing the level of sound through an opening, comprising the step of disposing in the opening a multiple layer glass panel comprising any of the interlayers of the present invention.

The present invention also includes methods of manufacturing an interlayer, comprising the steps of forming a first polymer layer, a second polymer layer, and a third polymer layer, wherein the three polymer layers have compositions according to the three layer embodiments as described elsewhere herein, and wherein the surface topography is imparted through melt fracture, as described elsewhere herein, and laminating the three polymer layers together to form the interlayer.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multiple layer interlayer of the present invention.

Also included are multiple layer glazing panels having plastics, such as acrylics, or other suitable materials in place of the glass panels.

The present invention also includes multiple layer interlayers and multiple layer glass panels made by the methods of the present invention.

Polymer Film

As used herein, a "polymer film" means a relatively thin and rigid polymer layer that functions as a performance enhancing layer. Polymer films differ from polymer layers, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 min to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus, regardless of composition, than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or an antifog layer, as are known in the art.

Polymer Layer

As used herein, a "polymer layer" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

The polymer layer can comprise any suitable polymer, and, in a preferred embodiment, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives disclosed herein can be used with the polymer layer having a polymer consisting of or consisting essentially of poly(vinyl butyral).

In one embodiment, the polymer layer comprises a polymer based on partially acetalized poly(vinyl alcohol)s. In another embodiment, the polymer layer comprises a polymer selected from the group consisting of poly(vinyl butyral), polyurethane, polyvinyl chloride, poly(ethylene vinyl acetate), combinations thereof, and the like. In other embodiments, the polymer layer comprises plasticized poly(vinyl butyral). In further embodiments the polymer layer comprises poly(vinyl butyral) and one or more other polymers. Other polymers having a proper plasticizing capacity can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer layers.

For embodiments comprising poly(vinyl butyral), the poly (vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that, in various embodiments, residual hydroxyl content will be controlled, as described elsewhere herein.

In various embodiments, the polymer layer comprises poly (vinyl butyral) having a molecular weight greater than 30,000, 40,000, 50,000, 55,000, 60,000, 65,000, 70,000, 120, 000, 250,000, or 350,000 grams per mole (g/mole or Daltons). Small quantities of a dialdehyde or trialdehyde can also be added during the acetalization step to increase molecular weight to greater than 350,000 Daltons (see, for example, U.S. Pat. Nos. 4,874,814; 4,814,529; and 4,654,179). As used herein, the term "molecular weight" means the weight average molecular weight.

If additional, conventional polymer layers are used in addition to any of the embodiments described above as having plasticizer content differences, those additional, conventional polymer layers can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethyl hexanoate).

Adhesion control agents (ACAs) can also be included in the polymer layers of the present invention to impart the desired adhesiveness. These agents can be incorporated into the outer layers in a three polymer layer embodiment, for example. Any of the ACAs disclosed in U.S. Pat. No. 5,728, 472 can be used. Additionally, residual sodium acetate and/or potassium acetate can be adjusted by varying the amount of the associated hydroxide used in acid neutralization. In various embodiments, polymer layers of the present invention comprise, in addition to sodium acetate, magnesium bis(2-ethyl butyrate)(chemical abstracts number 79992-76-0). The magnesium salt can be included in an amount effective to control adhesion of the polymer layer to glass.

Additives may be incorporated into the polymer layer to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer layers. Agents that can be used include dyes and pigments such as indium tin oxide, antimony tin oxide, or lanthanum hexaboride ($LaB_6$).

Any suitable method can be used to produce poly(vinyl butyral). Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, "resin" refers to the polymeria (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet.

For layers or surfaces not specifically controlled through melt fracture, as described above, the surface texture at either or both sides of the layers may be controlled by providing texture at a roller surface, Furthermore, the layer can be configured to include spaced projections that define a temporary surface irregularity to facilitate the deairing of the layer during lamination processes after which the elevated temperatures and pressures of the laminating process cause the projections to melt into the layer, thereby resulting in a smooth finish. In the die roll process, a blade and a roll are used, and polymer melt is cast onto the roll, which has reverse of the desired pattern formed on its surface.

Fabrication of a multiple layer interlayer can be accomplished by using known techniques in the art, such as independently producing three layers of polymer layer, and then laminating the three layers together under appropriate conditions, such as pressure and heat, to yield a single, multiple layer interlayer. As described above, the two surfaces that will be in contact with glass in the final laminate can have a surface topography that is imparted by melt fracture at the time of extrusion of the individual polymer layers.

In various embodiments, a "prelaminate" interlayer is formed by assembling the individual interlayers into a stack of layers, and then subjecting the layers to sufficient heat and pressure to tack the layers together, thereby forming the prelaminate. The prelaminate can then be rolled or otherwise stored as desired until it is used in a laminated glazing, at which point the prelaminate is placed between two layers of glass and laminated to form the final multiple layer glazing.

in various embodiments, the interlayers of the present invention can have total thicknesses of 0.1 to 2.5 millimeters, 0.2 to 2,0 millimeters, 0.25 to 1.75 millimeters, and 0.3 to 1.5 millimeters (mm). The individual polymer layers of a multiple layer interlayer can have, for example, approximately equal thicknesses that, when added together, result in the total thickness ranges given above. Of course, in other embodiments, the thicknesses of the layers can be different, and can still add to the total thicknesses given above.

The parameters for the polymer layer described above apply as well to any layer in a multiple layer construct of the present invention that is a poly(vinyl butyral) type layer.

The following paragraphs describe various techniques that can be used to improve and/or measure the characteristics of the polymer layer.

To determine $R_z$ and $R_{sm}$, a 15 centimeter by 15 centimeter test sample of plasticized polymer layer is placed on a vacuum plate regulated by fluid at room temperature circulating through it. A vacuum of 3.44 kPa (5 psi) is imposed to draw the sample against the plate surface. A model S8P Perthometer with a PRK drive unit and an RFHTB-250 tracing stylus (available from Mahr Gage Co., New York) is used to directly measure polymer layer surface roughness of each side of the test sample. Profile selection is set to "R" on the instrument. The tracing stylus moves automatically across the sample surface. The length of each trace ($L_T$) is 17.5 millimeter composed of 7 sequential sample lengths $L_c$ of 2.5 mm. The measuring length ($L_M$) is 12.5 millimeter and is composed of the 5 sequential sample lengths ($L_C$) obtained by eliminating the first and the last sections of each trace. The average value of individual roughness depths in these five sequential sample lengths $L_c$ is determined and $R_z$ is the average of ten such determinations, five taken in the machine direction of extrusion (MD) and five in the cross machine direction (CMD). The distance between two consecutive traces in each direction is 3 mm. $R_{sm}$, the average peak distance, is determined from the same measurement as for $R_z$. Mean distance of all profile peaks within the each measuring length ($L_M$) is determined and the reported $R_{sm}$ for each machine direction is the average of five such determinations in that direction, Set-up switch positions on the Perthometer during $R_z$ and $R_{sm}$ testing are as follows: Filter: GS, Profile: R, LC: N 2.5 mm, LT: 17.5 mm, VB: 625 micrometers. $R_z$ and $R_{sm}$ values herein throughout are given in micrometers.

The following procedure is used to measure mottle: A shadow graph light (a Xenon Point Light Source System powered by a kni-tron rectifier (model number R2120-2) from Kneisley Electric company, Toledo, Ohio) is positioned in a dark room at 1 meter from a white surface. A sample is held between the white surface and the light source next to a "maximum standard level" standard laminate that represents the lowest acceptable optical quality. The image projected on the white surface is visually examined. If the sample image is worse than the maximum standard level standard, then the sample is rejected as having too much distortion. Tithe sample is at least as good as the maximum standard level standard, then the sample is compared to progressively optically superior standards until a grade is determined for the sample. The sample is evaluated in the cross machine direction and the machine direction, and the worst grade of the two is designated the grade for the sample. A grade of 0 indicates that no optical distortion is visible. A grade of 1 or 2 indicates some minor distortion is observable. A grade of 3 to 4 indicates that more than minor distortion is apparent. A grade of 5 or higher indicates that significant distortion is observable and the laminate would likely be unusable in applications that require visual clarity, such as in automobile windshields.

The clarity of a polymer layer, and particularly a poly(vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with. ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corp. by methods described in international standard ISO 9050:1990. In various embodiments, the transmittance through a polymer layer of the present invention is at least 60%, at least 70%, or at least 80%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about $-18°$ C. ($0°$ F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

Tensile break stress can be determined for a polymer layer according to the procedure described in JIS K6771.

EXAMPLES

Example 1

Three three-layer interlayers are separately coextruded. Each interlayer comprises a 0.1524 millimeter (6 mil) layer sandwiched between two 0.3302 millimeters (13 mil) layers for a total thickness of 0.8128 millimeters (32 mils). The inner layer comprises 75 phr plasticizer (triethylene glycol di-(2-ethylhexanoate)) and 11.0% residual poly(vinyl alcohol), while the outside layers comprise 38 phr plasticizer (triethylene glycol di-(2-ethylhexanoate)) and 18.5% residual poly (vinyl alcohol).

Surface characteristics of the three layers are controlled during coextrusion with 30 melt fracture to provide differing levels of $R_{sm}$ and $R_z$. Mottle, $R_{sm}$, and $R_z$ for each interlayer is determined according to the procedure provided elsewhere herein. $R_{sm}$ and $R_z$ are the machine direction values (cross machine direction values are lower).

| Mottle Grade | Side 1, $R_{SM}$ | Side 2, $R_{SM}$ | Side 1 $R_Z$ | Side 2 $R_Z$ |
|---|---|---|---|---|
| 2 | 709 | 694 | 41.1 | 35.5 |
| 4 | 999 | 996 | 37.8 | 35.6 |
| 5 | 1008 | 1054 | 54.8 | 55.4 |

By virtue of the present invention, it is now possible to provide multiple layer interlayers that reduce sound transmission and that are easily handled and readily incorporated into multiple layer constructs, such as laminated glass panels for windshields and architectural windows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising residual acetate content in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

The invention claimed is:

1. A method for producing a poly(vinyl butyral) interlayer comprising:
    forming a first poly(vinyl butyral) melt, a second poly(vinyl butyral) melt, and a third poly(vinyl butyral) melt;
    coextruding said first poly(vinyl butyral) melt, said second poly(vinyl butyral) melt, and said third poly(vinyl butyral) melt to form said interlayer comprising, in order, a first low plasticizer content poly(vinyl butyral) layer, a high plasticizer content poly(vinyl butyral) layer with 30 to 100 phr by weight plasticizer, and a second low plasticizer content poly(vinyl butyral), and
    inducing and controlling melt fracture during coextruding such that both surfaces of said interlayer have an $R_z$ of 20-60 microns and an $R_{sm}$ of less than 800 microns that is imparted by melt-fracture, wherein the step of inducing and controlling melt fracture is carried out using one or more of the following techniques—
    (i) controlling the temperature of the die lips or lands at the extrusion opening through which interlayer is extruded, or
    (ii) controlling the rate of cooling of the interlayer immediately after coextrusion;
    wherein the first low plasticizer content poly(vinyl butyral) layer has a tensile break stress that is at least 15 kilograms per square centimeter greater than the tensile break stress of said high plasticizer content poly(vinyl butyral) layer, and said second low plasticizer content poly(vinyl butyral) layer has a tensile break stress that is at least 15 kilograms per square centimeter greater than the tensile break stress of said high plasticizer content poly(vinyl butyral) layer, and
    wherein the interlayer has a mottle value of less then 4.

2. The method of claim 1, wherein both surfaces of said interlayer have an $R_{sm}$ value of less than 700 microns.

3. The method of claim 1 wherein the low plasticizer content poly(vinyl butyral) layers differ from the high plasticizer content poly(vinyl butyral) layer by at least 8 phr by weight in plasticizer content.

4. The method of claim 1 wherein the low plasticizer content poly(vinyl butyral) layers differ from the high plasticizer content poly(vinyl butyral) layer by at least 10 phr by weight in plasticizer content.

5. The method of claim 1 wherein the low plasticizer content poly(vinyl butyral) layers differ from the high plasticizer content poly(vinyl butyral) layer by at least 12 phr by weight in plasticizer content.

6. The method of claim 1 wherein the low plasticizer content poly(vinyl butyral) layers differ from the high plasticizer content poly(vinyl butyral) layer by at least 15 phr by weight in plasticizer content.

7. The method of claim 1 wherein the low plasticizer content poly(vinyl butyral) layers differ from the high plasticizer content poly(vinyl butyral) layer by at least 18 phr by weight in plasticizer content.

8. The method of claim 1 wherein the low plasticizer content poly(vinyl butyral) layers differ from the high plasticizer content poly(vinyl butyral) layer by at least 20 phr by weight in plasticizer content.

9. The method of claim 1 wherein said interlayer has no embossing.

10. The method of claim 1 wherein the interlayer has a total thickness of 0.1 to 2.5 millimeters.

11. The method of claim 1 wherein the first and second low plasticizer content poly(vinyl butyral) layers each have a tensile break stress greater than 135 kilograms per square centimeter, wherein the high plasticizer content poly(vinyl butyral) layer has a tensile break stress less than 120 kilograms per square centimeter.

12. The method of claim 1 wherein the high plasticizer content poly(vinyl butyral) layer comprises 40 to 90 phr by weight plasticizer, wherein the low plasticizer content poly(vinyl butyral) layers differ from the high plasticizer content poly(vinyl butyral) layer by at least 12 phr by weight in plasticizer content, wherein both surfaces of said interlayer have an $R_z$ of 25-50 microns and an $R_{sm}$ of less than 700 microns.

13. The method of claim 1 wherein the high plasticizer content poly(vinyl butyral) layer comprises 50 to 80 phr by weight plasticizer, wherein the low plasticizer content poly(vinyl butyral) layers differ from the high plasticizer content poly(vinyl butyral) layer by at least 8 phr by weight in plasticizer content, wherein both surfaces of said interlayer have an $R_z$ of 25-50 microns and an $R_{sm}$ of less than 800 microns.

14. A method for producing a multiple layer glass panel comprising:
    forming a first poly(vinyl butyral) melt, a second poly(vinyl butyral) melt, and a third poly(vinyl butyral) melt;
    coextruding said first poly(vinyl butyral) melt, said second poly(vinyl butyral) melt, and said third poly(vinyl butyral) melt to form an interlayer comprising, in order, a first low plasticizer content poly(vinyl butyral) layer, a high plasticizer content poly(vinyl butyral) layer with 30 to 100 phr by weight plasticizer, and a second low plasticizer content poly(vinyl butyral);
    inducing and controlling melt fracture during coextruding such that both surfaces of said interlayer have an $R_z$ of 20-60 microns and an $R_{sm}$ of less than 800 microns controlling melt fracture during coextruding such that both surfaces of said interlayer have an $R_z$ of 20-60 micro and an $R_{sm}$ of less than 800 micros, wherein the step of inducing and controlling melt fracture is carried out using one or more of the following techniques—
(i) controlling the temperature of the die lips or lands at the extrusion opening through which interlayer is extruded, or
controlling the rate of cooling of the interlayer immediately after coextrusion; and
laminating said interlayer between two glass substrates to form said multiple layer glass panel;
wherein the first low plasticizer content poly(vinyl butyral) layer has a tensile break stress that is at least 15 kilograms per square centimeter greater than the tensile break stress of said high plasticizer content poly(vinyl butyral) layer, and said second low plasticizer content poly(vinyl butyral) layer has a tensile break stress that is at least 15 kilograms per square centimeter greater than the tensile break stress of said high plasticizer content poly(vinyl butyral) layer, and
wherein the interlayer has a mottle value of less than 4.

15. The method of claim 14, wherein both surfaces of said interlayer have an $R_{sm}$ value of less than 700 microns.

16. The method of claim 14 wherein the low plasticizer content poly(vinyl butyral) layers differ from the high plasticizer content poly(vinyl butyral) layer by at least 8 phr by weight in plasticizer content.

17. The method of claim 14 wherein the low plasticizer content poly(vinyl butyral) layers differ from the high plasticizer content poly(vinyl butyral) layer by at least 10 phr by weight in plasticizer content.

18. The method of claim 14 wherein the low plasticizer content poly(vinyl butyral) layers differ from the high plasticizer content poly(vinyl butyral) layer by at least 12 phr by weight in plasticizer content.

19. The method of claim 14 wherein the low plasticizer content poly(vinyl butyral) layers differ from the high plasticizer content poly(vinyl butyral) layer by at least 15 phr by weight in plasticizer content.

20. The method of claim 14 wherein the low plasticizer content poly(vinyl butyral) layers differ from the high plasticizer content poly(vinyl butyral) layer by at least 18 phr by weight in plasticizer content.

21. The method of claim 14 wherein the low plasticizer content poly(vinyl butyral) layers differ from the high plasticizer content poly(vinyl butyral) layer by at least 20 phr by weight in plasticizer content.

22. The method of claim 14 wherein the sound transmission loss for the multiple layer glass panel is at least 2 dB greater than a comparable reference panel having a single layer interlayer with the same thickness as the multiple layer interlayer and being formed of same material used for the first low plasticizer content poly(vinyl butyral) layer.

23. The method of claim 14 wherein said interlayer has no embossing.

24. The method of claim 14 wherein the interlayer has a total thickness of 0.1 to 2.5 millimeters.

25. The method of claim 14 wherein the first and second low plasticizer content poly(vinyl butyral) layers each have a tensile break stress greater than 135 kilograms per square centimeter, wherein the high plasticizer content poly(vinyl butyral) layer has a tensile break stress less than 120 kilograms per square centimeter.

26. The method of claim 14 wherein the high plasticizer content poly(vinyl butyral) layer comprises 40 to 90 phr by weight plasticizer, wherein the low plasticizer content poly(vinyl butyral) layers differ from the high plasticizer content poly(vinyl butyral) layer by at least 12 phr by weight in plasticizer content, wherein both surfaces of said interlayer have an $R_z$ of 25-50 microns and an $R_{sm}$ of less than 700 microns.

27. The method of claim 14 wherein the high plasticizer content poly(vinyl butyral) layer comprises 50 to 80 phr by weight plasticizer, wherein the low plasticizer content poly(vinyl butyral) layers differ from the high plasticizer content poly(vinyl butyral) layer by at least 8 phr by weight in plasticizer content, wherein both surfaces of said interlayer have an $R_z$ of 25-50 microns and an $R_{sm}$ of less than 800 microns.

* * * * *